United States Patent [19]

Peter

[11] Patent Number: 4,746,051
[45] Date of Patent: May 24, 1988

[54] ULTRASONIC WELDING CONTROL

[75] Inventor: David A. Peter, Anderson, Ind.

[73] Assignee: General Motors Corporation, Detroit, Mich.

[21] Appl. No.: 447,777

[22] Filed: Dec. 8, 1982

[51] Int. Cl.⁴ .................................................. B23K 20/10
[52] U.S. Cl. .................................... 228/102; 228/1.1; 228/110
[58] Field of Search ................... 228/1 R, 8, 102, 103, 228/110

[56] References Cited

U.S. PATENT DOCUMENTS

| | | | |
|---|---|---|---|
| 3,191,441 | 6/1965 | Erickson | 73/432 |
| 3,532,853 | 10/1970 | McKinney et al. | 219/131 |
| 3,573,781 | 4/1971 | Shoh | 228/1 R |
| 3,784,079 | 1/1974 | Spanjer | 228/1 R |
| 3,848,792 | 11/1974 | Mims | 228/1 R |
| 4,047,657 | 9/1977 | Mims | 228/103 |

Primary Examiner—Kenneth J. Ramsey
Attorney, Agent, or Firm—C. R. Meland

[57] ABSTRACT

A method and apparatus for controlling ultrasonic welding and determining whether the weld is of acceptable quality. Power input to ultrasonic welding apparatus is detected and converted to a signal indicative of energy input. When power input exceeds a power threshold level a timer begins to measure elapsed time and energy input begins to be monitored. Welding power is terminated when both elapsed time and energy level have exceeded predetermined values. If either elapsed time or energy level exceeded reject limit values when the weld was made the weld is rejected as being of unacceptable quality.

5 Claims, 3 Drawing Sheets

ULTRASONIC WELDING CONTROL

This invention relates to a method and apparatus for controlling ultrasonic welding and for determining whether the completed weld is of acceptable quality.

One of the problems associated with making a weld of acceptable quality by ultrasonic welding apparatus is the control of the time period of the welding cycle. If a fixed time period is selected for the welding cycle it is possible that the welded bond will not be sufficiently formed during the given time period due, for example, to variations in surface properties of the parts to be welded. On the other hand if a long time period is selected, that might take into account variations in surface properties or other factors, it is possible for the weld to be completed before the time period expires with the result that the excess time period will cause the formed weld to weaken or be degraded.

The prior art, as exemplified by the Spanjer U.S. Pat. No. 3,784,079 has recognized the surface property problem. The Spanjer patent, in contrast to utilizing a fixed time for the welding cycle, detects the voltage applied to the welding apparatus and when a dip in this voltage occurs the ultrasonic power to the welding apparatus is turned off.

In utilizing ultrasonic welding apparatus it is also desirable to be able to detect welded parts that are not of acceptable quality. One prior art approach to this is disclosed in the Shoh U.S. Pat. No. 3,573,781. In this patent a timer determines the length of time that ultrasonic welding takes place. The system detects the energy supplied to the workpiece and produces an alarm if the amount of energy transferred during the time period does not attain a predetermined value.

In contrast to the above-referenced prior art, the present invention controls the weld cycle by detecting the power applied to the welding apparatus and initiates a controlled welding cycle based on time and energy input only when welding power has exceeded a power threshold level. When the power threshold value is detected the method and apparatus of this invention begins monitoring both time and the amount of energy being applied to the weld. When a time setting, that represents elapsed time from the time that the power threshold is exceeded, and an energy setting is exceeded ultrasonic power is shutoff to terminate welding. Thus, it has been discovered that the amount of time that it takes from initiation of an ultrasonic weld to when a significant weld is started can vary due to differences in part location and part contamination. The amount of time spent in this time period does not effect the ultimate quality of the weld near as much as the amount of time spent after this period. When a significant weld starts the amount of power applied to the weld increases. Therefore, in accordance with this invention monitoring of time and energy does not begin until a power threshold is exceeded which is indicative of the fact that a significant weld has started.

It accordingly is an object of this invention to provide a method and apparatus for ultrasonic welding in which input power is detected and wherein the welding is terminated when a time period and energy level is exceeded that are measured from the point in time where welding power exceeds a power threshold.

Another object of this invention is to provide a method and apparatus for ultrasonic welding, of the type that has been described, which includes means for detecting whether the weld that has been made is of acceptable quality. In carrying this object forward, both the time period and the energy level that was attained after the power threshold was exceeded is monitored and if the magnitudes of either the time period or the energy level exceeds predetermined limit values an indication is given that the weld is defective and should be rejected.

IN THE DRAWINGS

Figure 1:
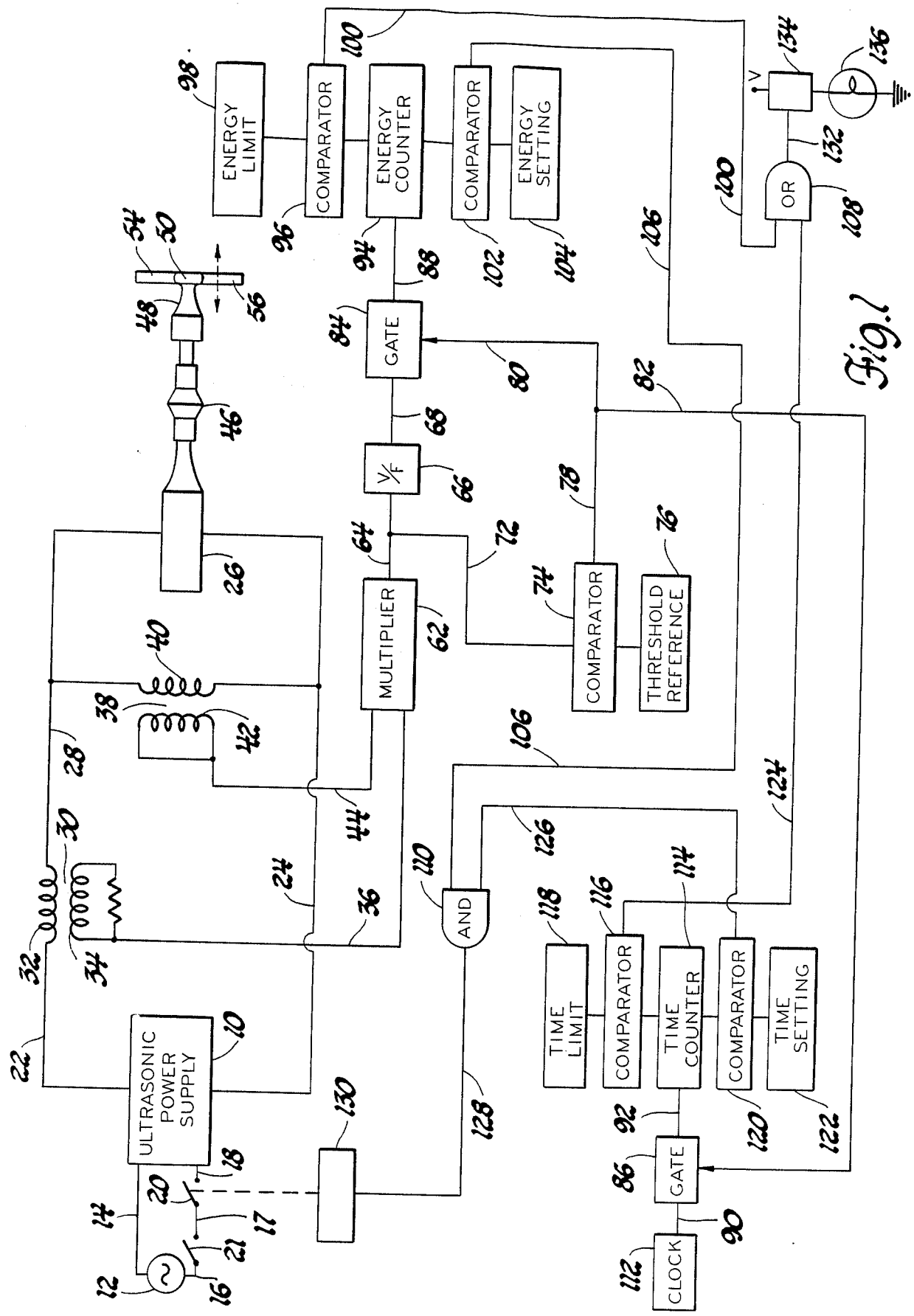
FIG. 1 is a schematic circuit diagram of an ultrasonic weld controller and weld quality monitor made in accordance with this invention.

Referring now to the drawings and more particularly to FIG. 1, the reference numeral 10 designates an ultrasonic power supply of conventional construction. The power supply is fed by a 60 Hz source of alternating current designated by reference numeral 12 through conductors 14, 16, 17 and 18. Switches 20 and 21 are connected, respectively, between conductors 17 and 18 and conductors 16 and 17. The switches are controlled in a manner to be described hereinafter. The ultrasonic power supply 10 converts the input 60 Hz signal to AC output power of, for example, 900 volts at 20 KHz. This voltage is applied to conductors 22 and 24. The conductor 24 is connected to a conventional ultrasonic converter 26 which, as known to those skilled in the art, converts the AC voltage applied thereto to mechanical movement. The converter 26 is further fed by conductors 22 and 28. A transformer 30, having a primary winding 32 connected in series with conductors 22 and 28, develops a voltage in its secondary winding 34 which is a function of the current supplied to converter 26. The voltage developed in the secondary winding 34 is applied to a conductor 36 and the magnitude of the signal on this conductor is therefore a function of input current to the converter 26. The system of FIG. 1 has another transformer designated by reference numeral 38 and including a primary winding 40 and a secondary winding 42. The primary winding 40 is connected across conductors 24 and 28 to thereby sense the voltage applied to converter 26. The secondary winding 42 develops a voltage which is applied to conductor 44 and the magnitude of the signal on line 44 therefore represents the voltage applied to converter 26.

Figure 2:
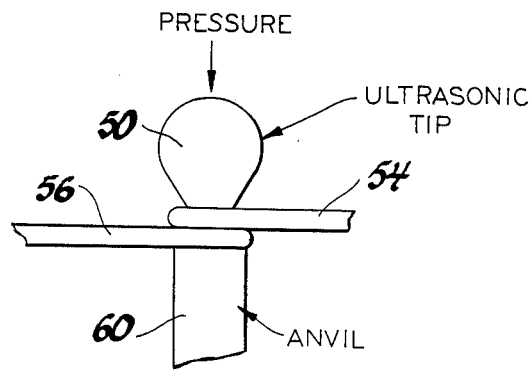
FIG. 2 is a view illustrating the relationship of the tip of the ultrasonic welder, the two parts to be welded and the anvil of the welder.

The converter 26 is coupled to a conventional booster 46 which in turn is connected to a horn 48. The horn 48 causes the ultrasonic welding tip 50 to vibrate in the directions indicated by the arrows in FIG. 1. The ultrasonic tip is illustrated in FIGS. 1 and 2 positioned above a pair of metallic parts 54 and 56 that are to be welded. As illustrated in FIG. 2, the parts 54 and 56 overlap and are compressed in a conventional fashion between the ultrasonic tip 50 and an anvil 60. As the ultrasonic tip is vibrated a weld is produced between the parts 54 and 56. The parts 54 and 56 may be, for example, formed respectively of aluminum and copper material as will be described in more detail hereinafter.

The conductors 36 and 44 provide inputs to an analog multiplier of any conventional construction designated by reference numeral 62. Since the multiplier 62 receives inputs corresponding to the current and voltage inputs to converter 26 the output of the multiplier, which is applied in line 64, represents the instantaneous power applied to converter 26. The direct analog voltage on conductor 64 is applied to a voltage to frequency converter 66 which may take the form of a standard analog to digital converter. The output of the analog to digital converter 66 is applied to a conductor 68 and this line therefore receives digital pulses, the frequency of which represent instantaneous power applied to converter 26.

The instantaneous power signal on line 64, which is a direct voltage, is applied to a conventional direct voltage comparator 74 by line 72. The comparator 74 compares the voltage on conductor 64 with a reference direct voltage provided by a threshold reference direct voltage source 76. When the voltage on conductor 64, which represents instantaneous power, exceeds the voltage provided by threshold reference source 76 the comparator 74 develops an output signal which is applied to conductor 78. As will be described in more detail, the magnitude of the voltage of reference source 76 represents a predetermined power threshold and after power is applied to converter 26 a signal is developed on conductor 78 when the power threshold is exceeded. The signal on conductor 78 is applied to conductors 80 and 82. The conductor 80 controls a conventional gate circuit 84 while the signal on conductor 82 controls a gate 86. Thus, whenever the power threshold is exceeded the gate 84 connects conductors 68 and 88 and the gate 86 likewise connects conductors 90 and 92.

The conductor 88 supplies a digital energy counter designated by reference numeral 94. The counter 94 is connected to a digital comparator 96 which compares the count in energy counter 94 with a count that is preset in an energy limit counter or register 98. As soon as the count in counter 94 exceeds the count in counter 98 the comparator 96 develops a signal which is applied to line 100.

The energy counter 94 is connected to another comparator 102 which compares the count in energy counter 94 with the count in an energy setting counter or register 104. As soon as the count in counter 94 exceeds the count in counter 104 the comparator 102 develops an output signal which is applied to line 106. The line 100 provides one input to an OR gate 108 while the line 106 is connected to one input of an AND gate 110.

The gate 86 controls the connection of a source of digital clock pulses 112 of constant frequency and a digital time counter 114. Thus, when the gate 86 connects conductors 90 and 92 the time counter 114 receives the clock pulses from the clock source 112. The time counter 114 is connected to a digital comparator 116 which compares the count in counter 114 with a preset digital count in a time limit digital counter or register 118. Another comparator 120 compares the count in time counter 114 with the count in a time setting register or counter 122.

As soon as the count in counter 114 exceeds the count in counter or register 118 comparator 116 develops an output signal which is applied to line 124 and this line forms another input for the OR gate 108. In a similar fashion, as soon as the count in counter 114 exceeds the count in counter or register 122 the comparator 120 develops an output signal applied to line 126 which forms another input to the AND gate 110.

The output of AND gate 110 is applied to a conductor 128 and this conductor is coupled to a device 130 that controls the switch 20. The device 130 may comprise a driver circuit and a conventional relay and can be arranged such that the relay contacts 20 are normally closed. When a signal is developed on conductor 128 the device 130 is energized to open switch 20 and thereby deenergize the welding system. The arrangement for terminating welding power, in response to the signal developed on line 128, can take various forms. Thus, a circuit may be opened in the ultrasonic generator 10 to terminate its operation. As an example, where the ultrasonic generator 10 comprises a transistor oscillator, the arrangement may be such that a switching transistor of the oscillator is biased nonconductive to terminate any output from the ultrasonic generator 10 and therefore terminate welding.

The switch 21 is connected in series with switch 20 and welding power is only provided when both switches are closed. The switch 21 is a welding power initiation switch and is closed whenever welding is to begin. It can be controlled by a relay coil or any other conventional apparatus. The function of switch 21, that is to initiate welding power, can be performed by other means that enables operation of the ultrasonic generator, for example circuitry that causes the oscillator of the generator 10 to operate when it is desired to initiate the application of welding power to converter 26. In summary, the apparatus for controlling the application of power to converter 26 and the subsequent shutoff of power to converter 26 can take various forms.

The output of OR gate 108 is connected to a line 132 which controls a switching device 134 of any conventional construction. The switching device may comprise a lamp driver transistor or relay so as to energize a signal lamp 136 from the voltage source V whenever the device 134 is conductive. The arrangement is such that when a signal is developed on conductor 132 the signal lamp 136 is energized. As will be more fully described hereinafter the energization of signal lamp 136 indicates that the weld that has been made should be rejected as not being of acceptable quality.

Figure 3:
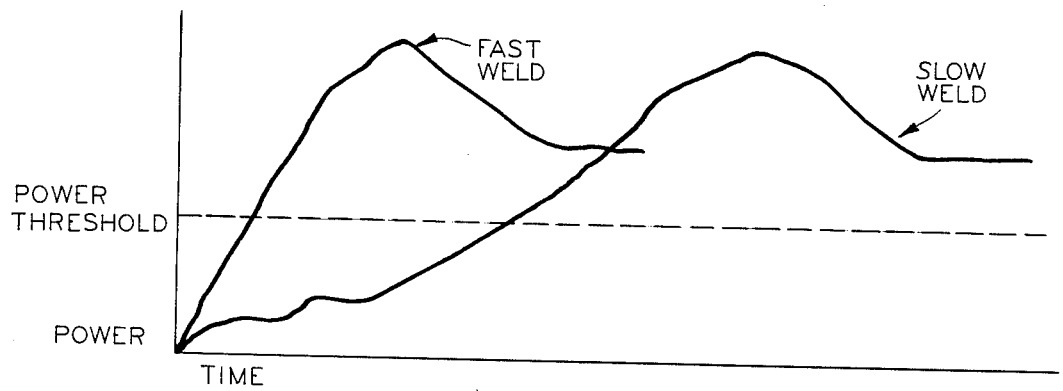
FIG. 3 illustrates curves representing power versus time when utilizing the welding apparatus shown in FIG. 1.

The operation of the system shown in FIG. 1 will now be described, utilizing the curves shown in FIGS. 3 and 4 as an aid in understanding the operation of the system. FIG. 3 illustrates power versus time curves for relatively fast and slow ultrasonic welds. The graph of FIG. 3 further illustrates a power threshold level represented by a dotted line that intersects the fast and slow weld curves.

The curves of FIG. 3 illustrate the power applied to the converter 26 and hence to the weld as a function of time. The curves begin at zero time and power level, that is at the instant ultrasonic power is applied to converter 26. In FIG. 3 it can be seen that the fast and slow welds reach the power threshold level at different elapsed time periods.

The system of FIG. 1 detects the point in time where the power applied to converter 26 exceeds the power threshold level. Thus, the voltage magnitude of threshold reference voltage source 76 has a value that corresponds to the power threshold level indicated by the dotted line in FIG. 3. When the power applied to converter 26 exceeds the power threshold level the gates 84 and 86 are biased conductive as has been described.

Figure 4:
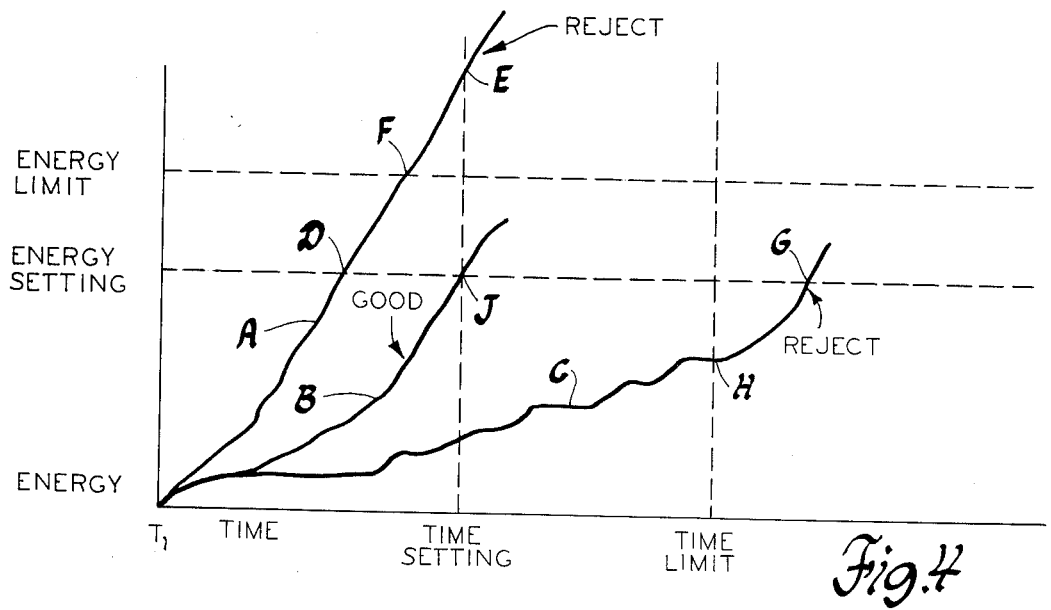
FIG. 4 illustrates curves of energy versus time when utilizing the apparatus shown in FIG. 1.

The three curves illustrated in FIG. 4 correspond to conditions of operation which occur after the power threshold is exceeded. Thus, time $T_1$, in FIG. 4, corresponds to the instant of time at which the power threshold was exceeded and only when this occurs is energy and time monitored. The three curves in FIG. 4 have been labeled A, B and C. The curve B depicts an acceptable weld whereas the curves A and C depict welds that are of unacceptable quality and therefore are rejected.

The system of FIG. 1 determines the point in time at which the ultrasonic energy applied to converter 26 is turned off and it also determines whether the weld that has been made is of acceptable quality. The turning off of ultrasonic power will be described first. When the power threshold is exceeded, both gates 84 and 86 are gated on. With gate 86 turned on the time counter 114 operates as a timer and its count is incremented at a uniform rate so it therefore contains an indication of elapsed time beginning at time $T_1$ shown in FIG. 4. The power applied to the converter 26 will increase and the energy-time relationship is as depicted by one of the curves in FIG. 4. When gate 84 was gated conductive it now causes the energy counter 94 to be incremented by the digital pulses, the frequency of which represent instantaneous power. The application of these pulses to the energy counter 94 integrates the instantaneous power so that the count in energy counter 94 represents instantaneous energy or in other words, the integral of instantaneous power.

The ultrasonic power to converter 26 is turned off whenever the time setting and the energy setting of FIG. 4 are both exceeded. Thus, the preset number in energy setting counter or register 104 represents the energy magnitude depicted by the energy setting dotted line shown in FIG. 4 and the time setting count in register or counter 122 represents the time magnitude depicted by the dotted line identified as time setting in FIG. 4. Taking curve A as an example, it is seen that the energy setting level was exceeded at a point D and the time setting magnitude was exceeded at point E. When the actual energy magnitude exceeds the energy setting the comparator 102 applies a signal to one input of the AND gate 110. Welding power is still supplied to the converter 26 until the energy curve reaches the point E (time setting exceeded) whereupon the comparator 120 develops an output on line 126 which is applied to the AND gate 110. The AND gate 110 now develops an output on line 128 which serves to shutoff the ultrasonic power to converter 26.

During the time that energy counter 94 is being incremented the comparator 96 is comparing the energy magnitude with an energy limit value preset in counter 98. This energy limit value corresponds to the dotted line shown in FIG. 4 and identified as energy limit. It can be seen that curve A exceeded the energy limit at point F and consequently the comparator 96 develops an output signal that is applied to one input of the OR gate 108. As a result, the signal lamp 136 is energized indicating that the quality of the weld is not acceptable and therefore the welded part should be rejected.

At the time the curve A was being generated by the welding operation the counter 114 was being incremented. Its count was being compared to a time limit count contained in counter or register 118. The digital value contained in device 118 corresponds to a magnitude indicated by the vertical dotted line in FIG. 4 identified as time limit. The variation of curve A did not exceed the time limit so that comparator 116 did not apply a signal to conductor 124. The system operates, however, on the basis that if either the energy limit or the time limit is exceeded, a defective weld is indicated and in this case the indication took place by virtue of the fact that the energy limit was exceeded at point F.

Curve C represents a situation in which the part is rejected as unacceptable because the time limit was exceeded. Thus, in Curve C welding is terminated at point G since, by this time, the curve C has exceeded both the time and energy settings. At point H the curve C has exceeded the time limit and under this condition of operation the comparator 116 will issue a signal causing the OR gate to conduct and turn on signal lamp 136 indicating an unacceptable weld.

Curve B represents an energy time curve that depicts a good ultrasonic weld. In curve B, ultrasonic power is turned off to terminate welding at approximately point J since at this point both the energy and time settings have been exceeded to actuate AND gate 110. In the case of curve B neither the energy limit nor the time limit was exceeded so signal lamp 136 is not energized indicating that an acceptable weld has been made.

Figure 5:
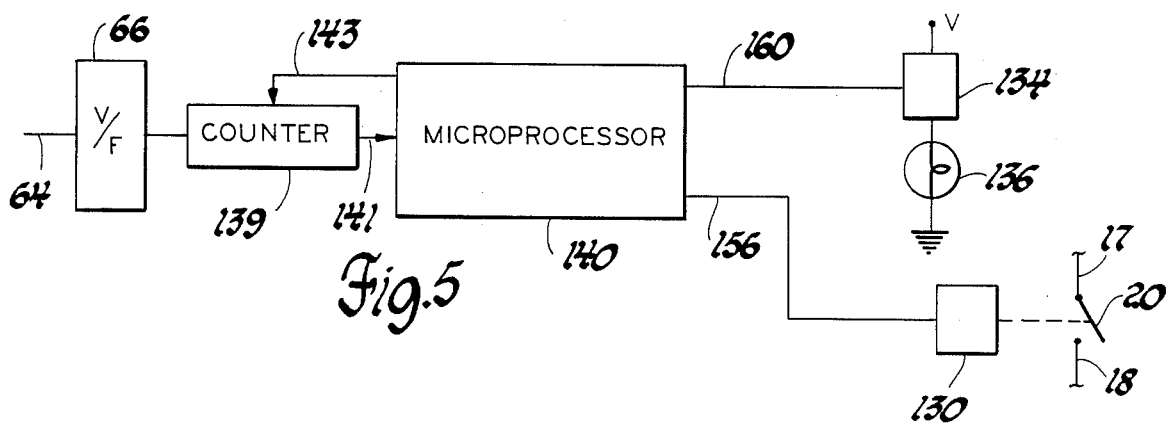
FIG. 5 illustrates a welding control and weld quality monitoring apparatus utilizing a microprocessor to perform the same functions as the system illustrated in FIG. 1.
Figure 6:
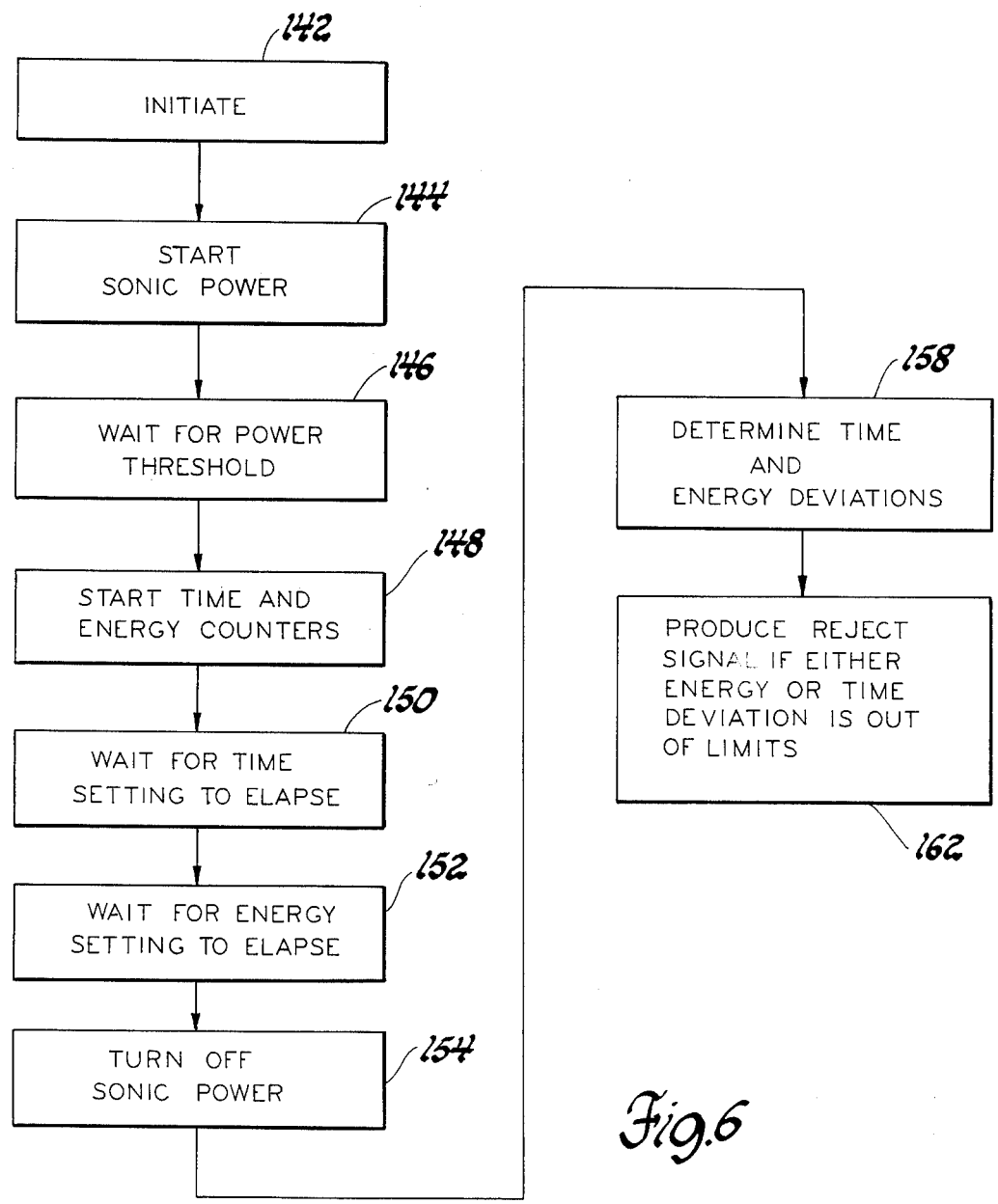
FIG. 6 is a flow diagram illustrating the programmed series of events that takes place under program control of the microprocessor system shown in FIG. 5.

It is preferred that the method and apparatus of this invention be implemented by a digital computer which takes the form of a microprocessor system. FIGS. 5 and 6 illustrate apparatus for performing the system functions of FIG. 1 by a programmed microprocessor. In FIG. 5 the microprocessor is designated by reference numeral 140. The microprocessor may be, for example a Motorola 6809. In FIG. 5 the same reference numerals have been utilized as were used in FIG. 1 to identify corresponding parts.

In the microprocessor system illustrated in FIG. 5 the output of the voltage to frequency converter 66 is applied to a counter 139 and the output of the counter is connected to the microprocessor 140 by line 141. The output of counter 139 is processed by the microprocessor to convert the count in counter 139 to a digital representation of instantaneous power and a digital representation of instantaneous energy. The microprocessor operates to sample the count in counter 139 during consecutive sampling periods, for example sampling periods of four millisecond duration. The time between sampling periods is insignificant. At the end of each four millisecond sampling period the counter 139 is reset to zero by line 143 under microprocessor control. Thus, during each sampling period the counter 139 will attain a count that is a function of the output frequency of V to F converter 66. In order to obtain a digital representation of the energy being supplied to converter 26 as a function of time the number of pulses that occur in consecutive four millisecond sampling periods are added in an energy counter in the microprocessor and the digital count in this counter therefore represents instantaneous energy as a function of time. In order to obtain a digital representation of instantaneous power the number of pulse counts that occurred during a four millisecond sampling period are divided by four milliseconds in order to obtain a digital representation of frequency in terms of cycles per second which, of course, represents instantaneous power input to converter 26. The microprocessor therefore develops and contains digital representations of instantaneous power and instantaneous energy level which are processed to control the time of turn off of ultrasonic power and to also determine the quality of weld that has been made.

The microprocessor contains a memory which may be a read only memory that contains the program for causing the microprocessor to execute the flow diagram shown in FIG. 6.

Referring now more particularly to FIG. 6, the first step in the program is to initiate operation and this step is designated by block 142. This can be accomplished by applying an initiate signal to microprocessor 140 which places all of the components of the microprocessor in an initial condition and also serves via an output from the microprocessor (which is not illustrated) to initiate a welding operation or in other words to cause ultrasonic power to be applied to converter 26. The start of sonic power is indicated by the block 144 and as an example, an output from the microprocessor can close the switch 21 to start the application of ultrasonic power. The microprocessor now performs the function of determining when the instantaneous power applied to converter 26 exceeds the power threshold shown in FIG. 3. This step in the program is identified by block 146. When the power threshold is exceeded, the microprocessor starts internal time and energy counters as depicted by block 148. The time counter monitors the elapse of time from a point in time where the power threshold was exceeded and the energy counter begins monitoring the variation of energy with time when the power threshold was exceeded as depicted in FIG. 4. The microprocessor now waits for the time and energy settings to elapse as indicated by blocks 150 and 152. This corresponds to determining when a given curve, in FIG. 4, has attained both the time and energy settings and corresponds to the AND function provided by AND gate 110 in FIG. 1. When the microprocessor detects that both the energy setting and time setting have been attained it operates to shutoff ultrasonic power to the converter 26 as indicated by the block 154 in FIG. 6. Thus, the microprocessor applies a signal to line 156 in FIG. 5 to actuate the device 130 to thereby open the switch 20 to shutoff ultrasonic power to the converter 26. This terminates the welding operation.

The microprocessor now determines whether the weld that has been made is acceptable or should be rejected. Thus, the microprocessor determines whether the count in either the time or energy counters has exceeded the limits shown in FIG. 4 and this step, in the flow chart, is indicated by reference numeral 158. If either the energy limit or the time limit has been exceeded the microprocessor issues a signal on conductor 160 to operate switching device 134 conductive to thereby energize the signal lamp 136 which indicates that the weld is not acceptable and should be rejected. This step, in the flow chart of FIG. 6, is identified by reference numeral 162.

It will be appreciated by those skilled in the art that the indication that the part should be rejected can be done in other ways than by energization of a signal lamp. Thus, the microprocessor can be arranged to provide a digital readout of the actual time and actual energy that was used in making the weld and the preset energy and time settings that were utilized as reference energy and time settings. By comparing the numbers, that represent actual and preset values, it is possible to determine whether the weld should be rejected or accepted.

One use for the welding method and apparatus of this invention is in the welding of copper to aluminum parts and specifically the welding of copper pads to aluminum heat sinks that form a part of a bridge rectifier of the general type illustrated in FIGS. 6 and 7 of the Cheetham et al., U.S. Pat. No. 3,538,362. The copper pads, instead of being located in bores as shown in U.S. Pat. No. 3,538,362, are placed against a flat inner surface of the heat sink. When welding a copper pad to the aluminum heat sink the welding tip 50 contacts the copper pad and the heat sink is supported. The pad and heat sink are clamped together by a vice arrangement and as the tip 50 is ultrasonically vibrated the copper pad is moved laterally relative to and in pressure contact with the heat sink to produce a weld in the area where the pad contacts the heat sink. Relating this to FIG. 2, the part 54 would be the copper pad and the part 56 the aluminum heat sink.

The following is a summary of the operation and some of the advantages of the welding method and apparatus of this invention. When welding is to be initiated switch 21 is closed and since switch 20 is in its normally closed position power will be applied to converter 26 to start vibration of welding tip 50. The welding power is monitored to determine when weld power exceeds the power threshold shown in FIG. 3 and until this happens there is no monitoring of time and energy by the welding control. The power threshold value is the level of power input to the weld that occurs when a welding bond is just starting. The time that elapses between the initiation of power application and the rise of power to the power threshold level can vary. Thus, if the parts to be welded are contaminated by a foreign substance the time required to reach the power threshold level will increase since welding power will be used to remove the foreign substance before any significant weld is started. Since the time period between power on and attainment of the power threshold may vary it is not used to control the termination of welding nor is it used to monitor weld quality. This is an important aspect of this invention.

When the power threshold is attained the system begins to monitor elapsed time and energy level as depicted in FIG. 4. Welding power is turned off when both the time setting and energy setting are attained and weld quality is ascertained by determining whether either the time limit or energy limit was exceeded during formation of the weld. The values of the energy and time limits can be in terms of a percentage of a respective energy and time setting. By way of example, if the time setting in FIG. 4 is 0.2 seconds and the permitted deviation is 50%, the time limit will be 0.3 seconds. The microprocessor system of FIG. 5 can be programmed to perform this calculation.

The magnitudes of the power threshold, the energy and time setting magnitudes and the energy and time limit magnitudes, shown in FIG.s 3 and 4, are all determined by the actual welding of parts with varying magnitudes and then selecting the magnitudes that produce acceptable welds. The acceptability of a weld is determined by checking the amount of force required to separate the welded parts. Assuming that curve B, in FIG. 4, produces an ideal weld the system of this invention determines how close the actual energy-time curve comes to the ideal curve and accepts or rejects the weld on that basis. Ideally, curve B would be followed for each weld that is made.

The embodiments of the invention in which an exclusive property or privilege is claimed are defined as follows:

1. A method of ultrasonic welding, the steps comprising, initiating welding by continuously applying power to ultrasonic welding apparatus that is operative to weld a pair of metallic parts, detecting when the applied power exceeds a power threshold, monitoring elapsed time beginning when said power threshold is exceeded, monitoring the level of energy applied to said welding apparatus beginning when said power threshold is exceeded, and terminating the application of welding power to the welding apparatus when both elapsed time and energy level have each exceeded predetermined values.

2. A method of ultrasonic welding and for determining the acceptability of the ultrasonic weld, the steps comprising, applying power to ultrasonic welding apparatus to start a welding operation, measuring power input to the welding apparatus, determining when the power input exceeds a power threshold level, monitoring elapsed time beginning when said threshold level is exceeded, monitoring the energy level of the energy supplied to the welding apparatus beginning when said power threshold is exceeded, terminating the application of power to the welding apparatus when the energy level and elapsed time each exceed predetermined values, and rejecting the weld as unacceptable if either the energy level or the elapsed time as measured from the time the power threshold was exceeded are greater than respective time or energy reject limit values.

3. A method of ultrasonic welding and for determining the acceptability of the ultrasonic weld, the steps comprising, applying power to ultrasonic welding apparatus to start a welding operation, measuring power input to the welding apparatus, determining when the power input exceeds a threshold level, monitoring elapsed time beginning when said threshold level is exceeded, converting power input to a parameter indicative of energy input to said welding apparatus, monitoring the energy level of the energy input to the welding apparatus beginning when said power threshold is exceeded, terminating the application of power to the welding apparatus when the energy level and elapsed time exceeds predetermined values, and rejecting the weld as unacceptable if either the energy level or the elapsed time as measured from the time the power threshold was exceeded are greater than respective time or energy reject limit values.

4. A control system for ultrasonic welding apparatus comprising, an ultrasonic power supply connected to an ultrasonic welding apparatus for supplying power thereto, switching means operative at the beginning of a weld cycle for continuously applying power to said welding apparatus from said power supply, means for measuring the power input to the welding apparatus, comparator means responsive to the power input to the welding apparatus and to a power reference signal for developing an output signal when said power input exceeds a power threshold level, timer means for measuring elapsed time, converter means responsive to power input for developing an energy signal that is a function of the amount of energy applied to said welding apparatus, means for initiating operation of said timer means and converter means when said comparator means develops said output signal, and means coupled to said switching means for terminating the application of power to said welding apparatus when the magnitude of said energy signal and the magnitude of elapsed time as measured by said timer means each exceed respective energy and time values.

5. A control system for ultrasonic welding apparatus comprising, an ultrasonic power supply connected to an ultrasonic welding apparatus for supplying power thereto, means for measuring the power input to the welding apparatus, comparator means responsive to the power input to the welding apparatus and to a power reference signal for developing an output signal when said power input exceeds a power threshold level, timer means for measuring elapsed time, converter means responsive to power input for developing an energy signal that is a function of the amount of energy applied to said welding apparatus, means for initiating operation of said timer means and converter means when said comparator means develops said output signal, means for terminating the application of power to said welding apparatus when the magnitude of said energy signal and the magnitude of elapsed time as measured by said timer means each exceed respective energy and time values, and means for developing a weld reject signal when either elapsed time or the magnitude of the energy signal exceeds predetermined reject limits.

* * * * *